(12) United States Patent
Deng (10) Patent No.: US 8,299,933 B2
(45) Date of Patent: Oct. 30, 2012

(54) DISPLAY BLANKING CONTROLLER FOR PORTABLE ELECTRONIC DEVICE

(75) Inventor: Ya-Wen Deng, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 786 days.

(21) Appl. No.: 12/484,324

(22) Filed: Jun. 15, 2009

(65) Prior Publication Data

US 2010/0109889 A1    May 6, 2010

(30) Foreign Application Priority Data

Oct. 30, 2008  (CN) .......................... 2008 1 0305308

(51) Int. Cl.
| G08B 21/00 | (2006.01) |
| G08B 1/08 | (2006.01) |
| G08B 13/08 | (2006.01) |
| G08B 17/00 | (2006.01) |
| G09G 5/00 | (2006.01) |
| G06F 3/041 | (2006.01) |
| G06F 3/033 | (2006.01) |

(52) U.S. Cl. ................ 340/636.1; 340/539.11; 340/547; 340/686.1; 340/686.4; 345/156; 345/173; 345/179

(58) Field of Classification Search ........................ None
See application file for complete search history.

(56) References Cited

U.S. PATENT DOCUMENTS

| 7,471,967 | B2* | 12/2008 | Kang et al. ................. 455/575.4 |
| 8,143,982 | B1* | 3/2012 | Lauder et al. .................. 335/219 |
| 2002/0139822 | A1* | 10/2002 | Infanti .......................... 224/197 |
| 2006/0105757 | A1* | 5/2006 | Kang et al. ..................... 455/418 |
| 2007/0149262 | A1* | 6/2007 | Navntoft .................... 455/575.3 |
| 2007/0159929 | A1* | 7/2007 | Louie ............................ 368/206 |
| 2008/0009330 | A1* | 1/2008 | Jung et al. .................. 455/575.3 |
| 2008/0012706 | A1* | 1/2008 | Mak-Fan et al. ............ 340/568.1 |
| 2008/0211770 | A1* | 9/2008 | Satou ............................ 345/157 |
| 2009/0079723 | A1* | 3/2009 | Wang et al. ................... 345/212 |
| 2009/0167729 | A1* | 7/2009 | Hino et al. .................... 345/204 |
| 2009/0213081 | A1* | 8/2009 | Case, Jr. ........................ 345/173 |
| 2011/0157802 | A1* | 6/2011 | Li ............................. 361/679.02 |
| 2011/0294470 | A1* | 12/2011 | Pasquero et al. ........... 455/412.2 |
| 2012/0068942 | A1* | 3/2012 | Lauder et al. ................. 345/173 |

* cited by examiner

*Primary Examiner* — Julie Lieu
(74) *Attorney, Agent, or Firm* — Altis Law Group, Inc.

(57) ABSTRACT

A portable electronic device comprises a battery, a display, a switch and a processor. The battery is for supplying operating power. The switch includes a magnetic element and a sensor configured for detecting the magnetic flux of the magnetic element. The sensor has a first predetermined value for turning on the switch. The switch is turning on in response to the magnetic flux of the magnetic element detected by the sensor being equal to the first predetermined value of the sensor. The processor is coupled to the switch, the battery and the display. The processor responsive to turning on of the switch for controlling supply of operating power from the battery to the display. The processor maintains supply of operating power from the battery to the display in response to turning on of the switch.

18 Claims, 6 Drawing Sheets

FIG. 6

DISPLAY BLANKING CONTROLLER FOR PORTABLE ELECTRONIC DEVICE

BACKGROUND

1. Technical Field

The present invention generally relates to display blanking controllers, and particularly to display blanking controllers used in portable electronic devices.

2. Description of Related Art

Many portable electronic devices are mobile and operated on battery power. An example of such a portable electronic device is a telephone. To improve mobility and user convenience, many telephones are powered by rechargeable batteries. One design goal for portable electronic devices including telephones is minimization of power consumption from the battery. One reason for this goal is to permit the use of physically smaller, lighter batteries. Such smaller and lighter batteries permit the portable electronic device itself to be physically smaller and lighter, and thereby more convenient for the user. A second reason for minimizing power consumption in a portable electronic device is to extent the operating time of the portable electronic device, which also enhances convenience for the user.

Displays in portable electronic devices are one source of substantial power consumption. One known method of reducing power consumption in a portable electronic device is blanking the display after a predetermined time. The display is blanked by removing power from portions of the display. Such portions include specific LED segments or LEDs used for backlighting a LCD display. Only one or a few isolated illuminated elements, such as LED indicators, remain energized to provide a visual indication that the portable electronic device is active. By blanking the display, power consumption can be substantially reduced.

The rationale for blanking the display is that there are times when a user no longer needs to see the display. For example, once a user has initiated a telephone call, the user no longer needs to see the display. Also, when the user is not actively using the telephone and the user is awaiting an incoming call, the user does not need to see the display.

In some instances, blanking the display can hinder user convenience. This can occur if the user is still holding the portable electronic device in his hand and still wants to see the information on the display. Blanking at such a time is inconvenient for the user. According to current designs, in order to get the information on the display to reappear, the user usually have to triggers the device by pressing a key or close and open the keypad cover.

Accordingly, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the exemplary display blanking controller and portable electronic device using the display blanking controller. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
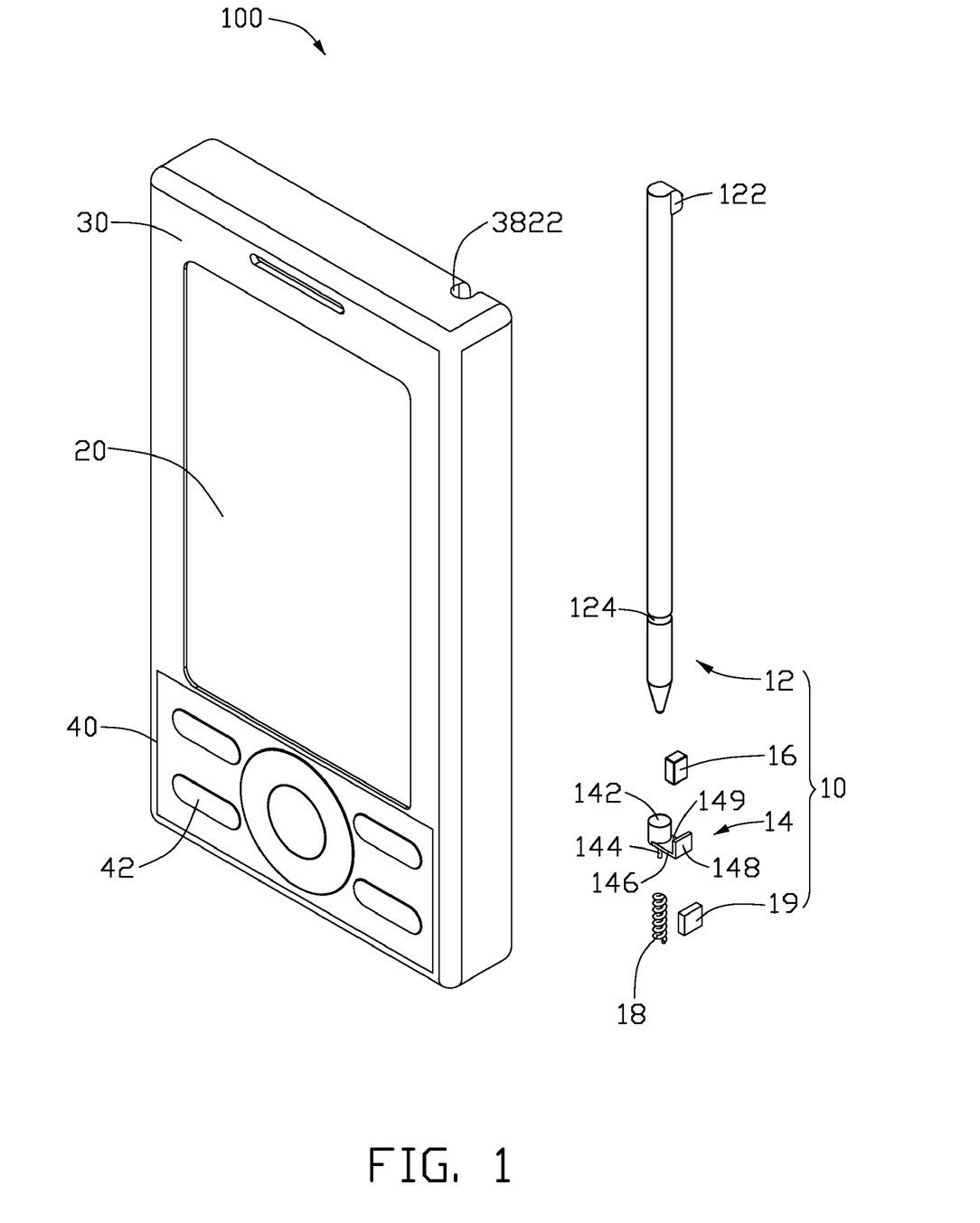
FIG. 1 is an exploded, isometric view of one embodiment of a display blanking controller used in a portable electronic device, the portable electronic device including the display blanking controller, a housing, and a display.
Figure 2:
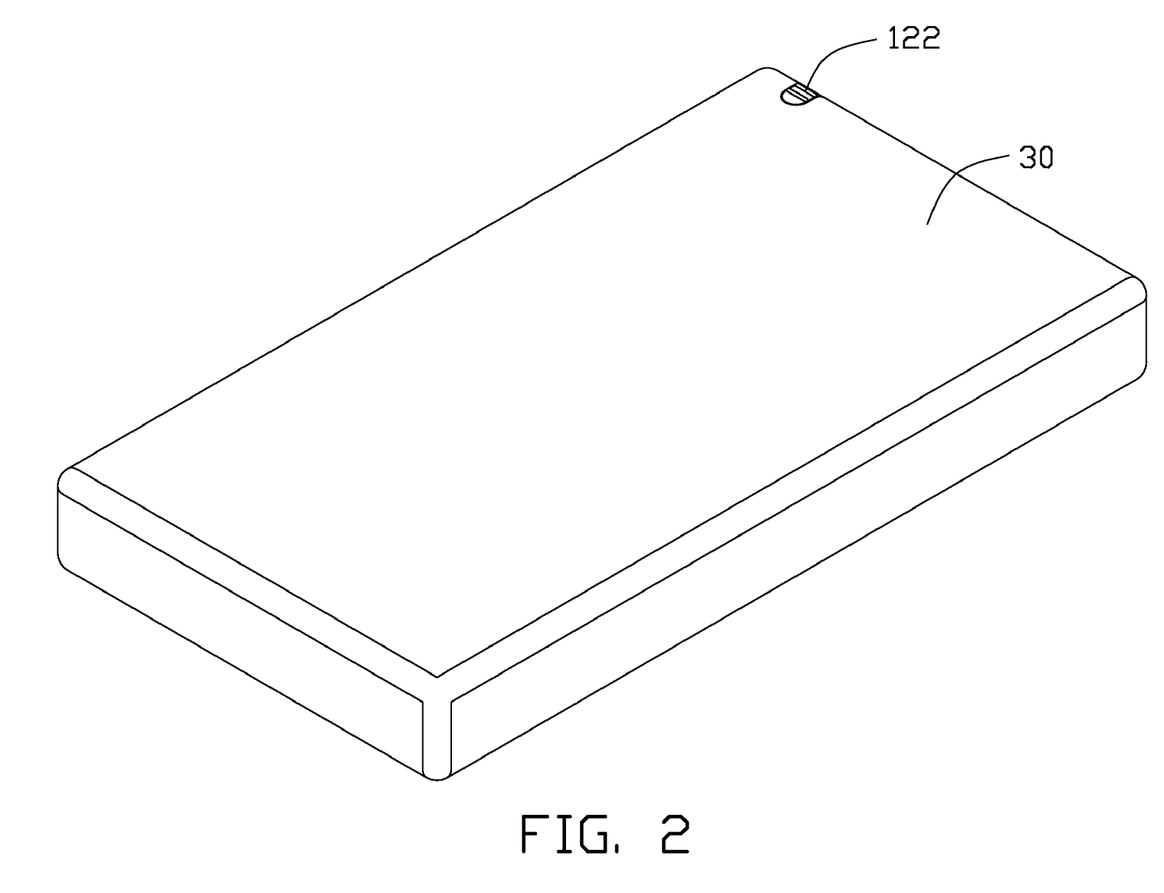
FIG. 2 is an assembled, isometric view of the portable electronic device shown in FIG. 1.

Referring to FIGS. 1 and 2, one embodiment of a display blanking controller 70 (seen FIG. 3) can be used on a portable electronic device 100, such as a cellular phone or any electronic device where a display blanking controller 70 is desirable. The portable electronic device 100 includes a housing 30, a display 20 disposed within the housing 30, and a display blanking controller 70 disposed within the housing 30. The portable electronic device 100 further includes a keypad 40 having a plurality of keys 42 and a battery 50 (seen in FIG. 3) configured for accommodated in the housing 30 to provide operating power for the display 20.

Figure 3:
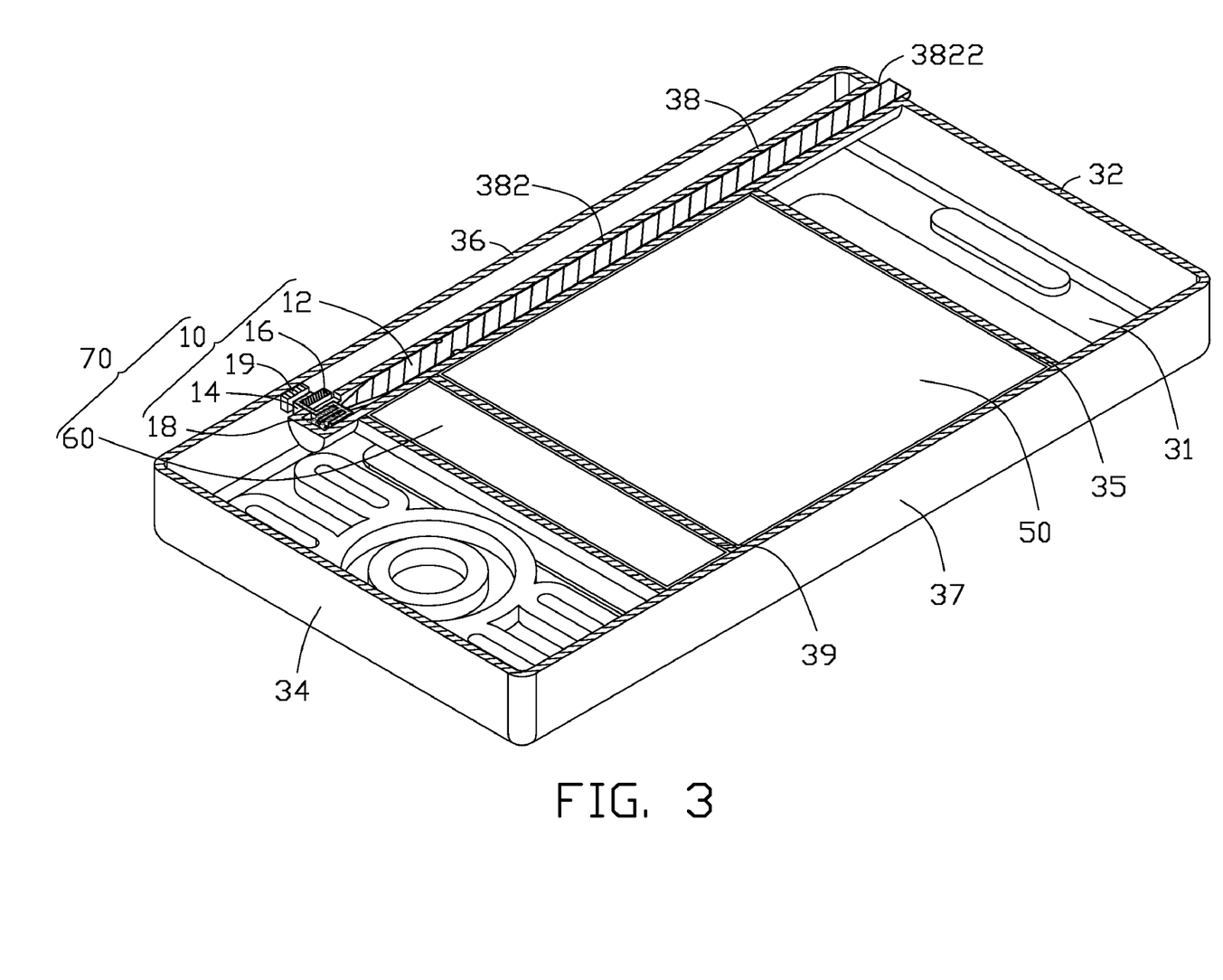
FIG. 3 is a cross-sectional view of the portable electronic device shown in FIG. 2.

Referring to FIGS. 1 and 3, the display blanking controller 70 includes a switch 10 and a processor 60 electrically coupled with the switch 10. The switch 10 includes a trigger 12, a slider 14, a magnetic element 16, an elastic member 18 and a sensor 19. The trigger 12 forms a user interface for operation of the switch 10, and the trigger 12 may be a stylus. The trigger 12 has a block 122 protruding from one end thereof and has an annular slot 124 defined at another end thereof.

Figure 4:
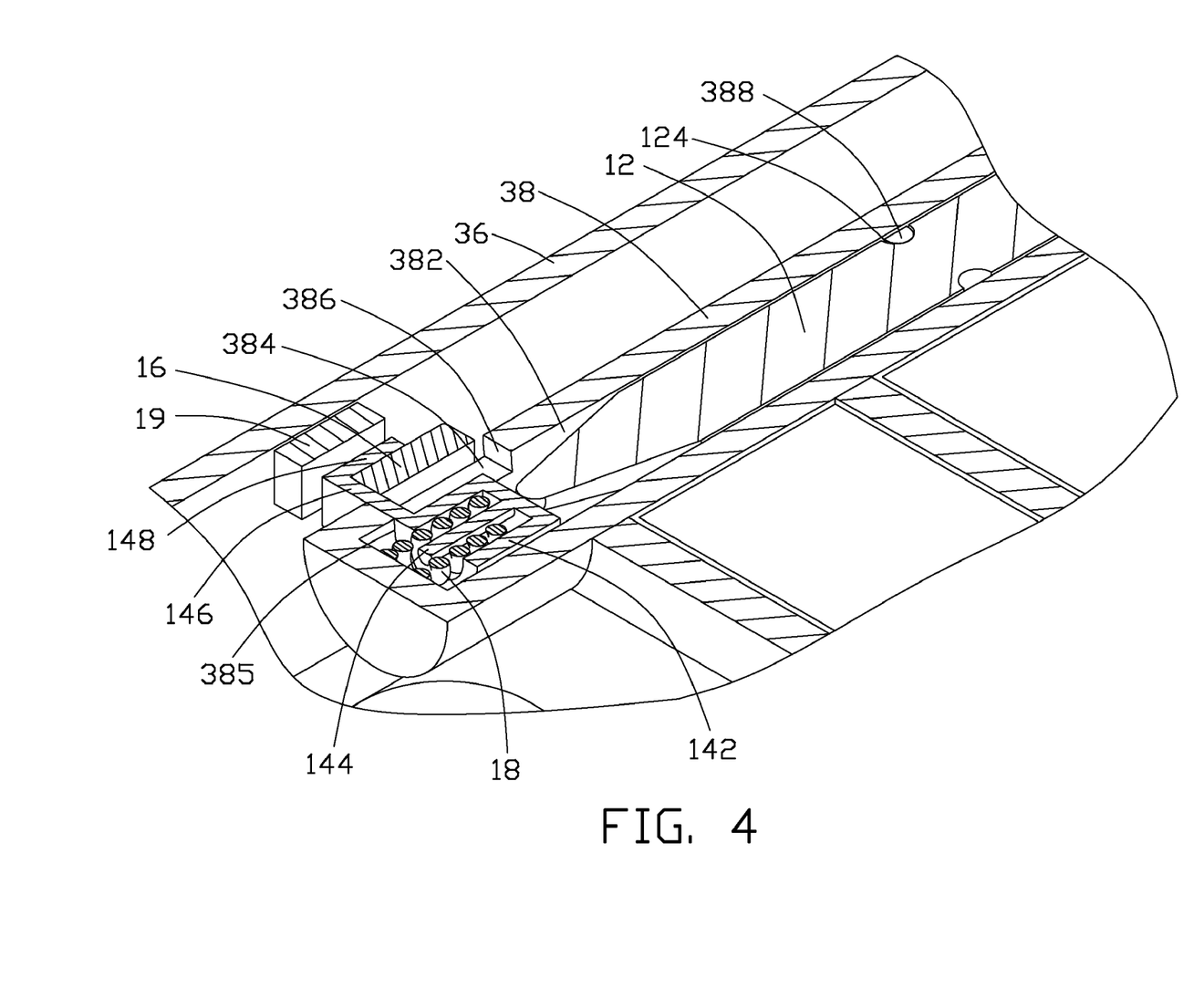
FIG. 4 is a partially enlarged view of the portable electronic device shown in FIG. 3.

Referring to FIGS. 1 and 4, the slider 14 includes a body section 142, a positioning pole 144 protruding outwardly from the bottom wall of the body section 142, a connecting section 146 perpendicularly protruding from a side wall of the body section 142 and a securing section 148 extending from a distal end of the connecting section 146. The connecting section 146 is parallel to and opposite to the body section 142, thus turned on the body section 142, the connecting section 146 and the securing section 148 cooperatively define a securing portion 149. The securing portion 149 is configured to accommodate the magnetic element 16 therein.

The elastic member 18 provides an elastic force for restoration of the slider 14. The elastic member 18 may be a compression spring winding on the positioning pole 144. One end of the elastic member 18 is resisted against the bottom wall of the body section 142, and anther end of the elastic member 18 is resisted against the housing 30.

The sensor 19 provides a first indication when the magnetic element 16 is located away from the sensor 19, and provides a second indication when the magnetic element 16 is located adjacent to the sensor 19. The sensor 19 is electrically coupled to the processor 60 for providing the first indication and the second indication to the processor 60. The first indication and the second indication are provided for the sensor 19 to detect variation in magnetic flux when the magnetic element 16 is moved away from the sensor 19. For illustration, the sensor 19 has a first predetermined value of the magnetic flux for providing the first indication, and a second predetermined value of the magnetic flux for providing the second indication. Once the magnetic flux of the magnetic element 16 detected by the sensor 19 is equal to the first predetermined value or the second predetermined value, the sensor 19 provides the first indication or the second indication, correspondingly. Any suitable sensor 19 can be used to detect distance to the magnetic element 16, such as magnetic indication sensor 19, remoteness detector or optoelectronic switch 10.

The processor 60 receives the first indication of the sensor 19 and generates a first blanking control signal according to the first indication. The processor 60 receives the second indication of the sensor 19 and generates a first blanking control signal according to the second indication. The first blanking control signal provides an indication that a user has turned on the switch 10 to operate the portable electronic device 100, so the processor 60 maintains supply of operating power to the display 20 in response to the first blanking control signal. The second blanking control signal provides an indication that a user has turned off the switch 10 to finish operating the portable electronic device 100, so the processor 60 cuts off supply of operating power to the display 20 in response to the second blanking control signal, to conserve battery power.

Referring to FIGS. 3 and 4, the housing 30 includes a bottom wall 31 and one or more sidewalls perpendicularly protruding from the bottom wall 31. The sidewalls includes a first sidewall 32, a second sidewall 34 opposite to the first sidewall 32, a third sidewall 36 connected the first sidewall 32 with and the second sidewall 34, and a fourth sidewall 37 opposite to the third sidewall 36. The first sidewall 32 has a retaining base 38 protruding from an inner surface thereof and parallel to the third sidewall 36. The retaining base 38 is a hollow pole having a blind hole 382 defined therein. The blind hole 382 extends along an axis of the retaining base 38. The blind hole 382 has an opening 3822 defined in the first sidewall 32, i.e., the opening 3822 communicates with an outer surface of the first sidewall 32.

The retaining base 38 has a trough 384 defined through the sidewall thereof and located adjacent to an end opposite to the opening 3822. The trough 384 corresponds to the slider 14, the body section 142 of the slider 14 enters into the blind hole 382 via the trough 384. The retaining base 38 has two inner walls, including a first inner wall 385 situated parallel to and adjacent to the bottom portion of the blind hole 382, and a second inner wall 386 situated opposite to the first inner wall 385. The inner walls 385, 386 are configured to limit the moving distance of the slider 14. The retaining base 38 has a plurality of protrusions 388 protruding from an inner surface thereof. The protrusions 388 are located between the opening 3822 and the trough 384. The protrusions 388 are latched into the slot 124 of the trigger 12 when the trigger 12 is located in the blind hole 382, to prevent the trigger 12 from detaching from the blind hole 382.

The housing 30 has a first compartment 35 defined between the retaining base 38 and the fourth sidewall 37 and a second compartment 39 defined adjacent to the first compartment 35. The first compartment 35 is used for accommodating the battery 50 therein. The second compartment 39 is used for accommodating the processor 60 therein.

Figure 5:
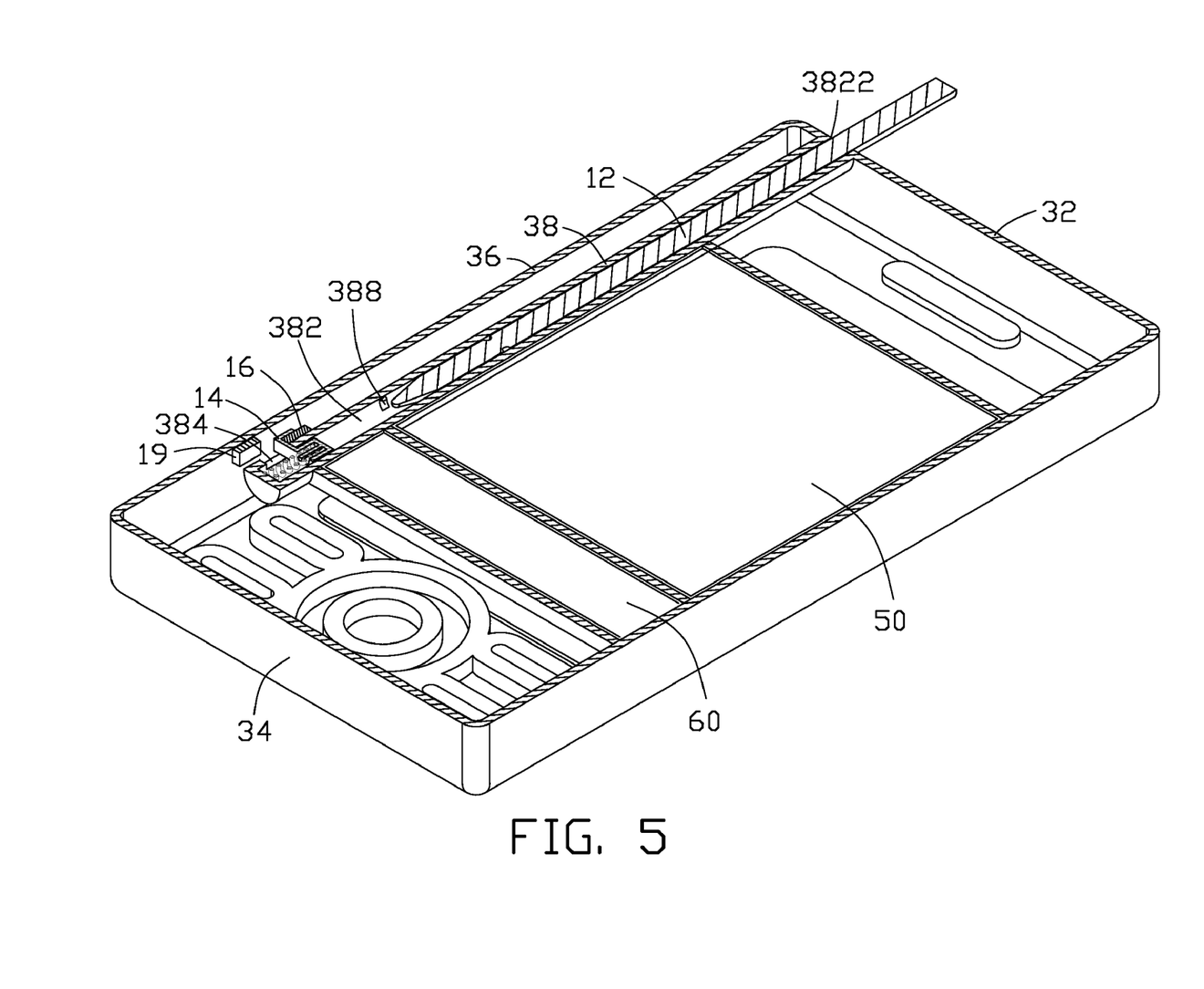
FIG. 5 is similar to FIG. 4, but a switch is in an turned off status.

Referring further to FIG. 5, to assemble the portable electronic device 100, firstly, the sensor 19 is attached to the third sidewall 36 of the housing 30. The elastic member 18 is winded to the positioning pole 144. The magnetic element 16 is latched into securing portion 149 of the slider 14. The body section 142 of the slider 14 is aligned with the trough 384 of the retaining base 38. Then the slider 14 is pressed toward the retaining base 38, so that the body section 142 passes through the trough 384 and enters into the blind hole 382. At this time, the portion of the connecting section 146 is accommodated in the trough 384, and the elastic member 18 is held between the bottom wall 31 of the body section 142 and the bottom wall 31 of the blind hole 382.

After that, the trigger 12 is aligned with and passes through the opening 3822 of retaining base 38, until the protrusions 388 of the retaining base 38 slide into the slot 124 of the trigger 12 to stably maintain the trigger 12 in the blind hole 382. At this stage, the trigger 12 continuously move downward to press the body section 142 to move toward the bottom wall 31 of the blind hole 382, such that the elastic member 18 is compressed to accumulate elastic force. Additionally, the connecting section 146 is stopped by the first inner wall 385, where the magnetic element 16 is located adjacent to the sensor 19 and the magnetic flux of the magnetic element 16 detected by the sensor 19 is equal to the second predetermined value of the sensor 19, i.e., the switch 10 is turned off. Thereby the sensor 19 provides the second indication to conserve battery power.

Figure 6:
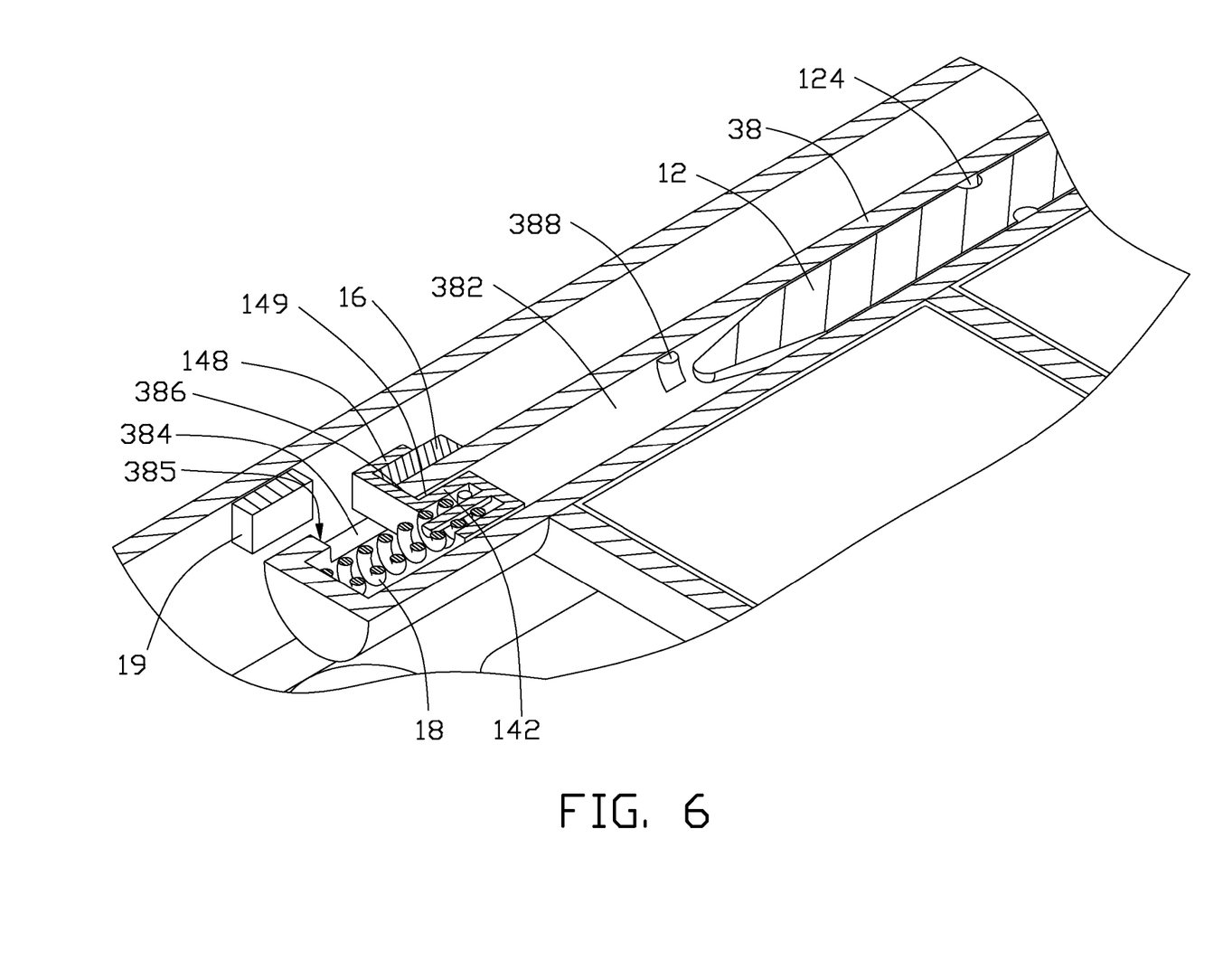
FIG. 6 is a partially enlarged view of the portable electronic device shown in FIG. 5.

Referring to FIGS. 5 and 6, when using the display blanking controller 70, the block 122 of the trigger 12 is pulled away from the housing 30, such that the trigger 12 is pulled from the blind hole 382. Once the protrusions 388 in the blind hole 382 are released from the slot 124 of the trigger 12, the slider 14 is drove away from the bottom wall of the blind hole 382 under the elastic force accumulated in the elastic member 18, until the connecting section 146 is stopped by the second inner wall 386 in the trough 384. During this stage, moving slider 14 push the trigger 12 continuously to slide out of the blind hole 382. When the connecting section 146 is stopped at the second inner wall 386, where the magnetic element 16 is located away from the sensor 19 and the magnetic flux of the magnetic element 16 detected by the sensor 19 is equal to the first predetermined value of the sensor 19, the sensor 19 provides the first indication, i.e., the switch 10 is turned on at this time. Then, the processor 60 receives the first indication of the sensor 19 and generates a first blanking control signal according to the first indication, i.e., the processor 60 maintains supply of operating power to the display 20 in response to the first blanking control signal.

As the user finish operating the portable electronic device 100, the trigger 12 is accommodated in the blind hole 382 to turn on the switch 10, and the sensor 19 provides the second indication. Then, the processor 60 receives the second indication of the sensor 19 and generates a second blanking control signal according to the second indication., i.e., the processor 60 cuts off supply of operating power to the display 20 in response to the second blanking control signal, to conserve battery power immediately.

Because the switch 10 is turned on whenever the magnetic flux of the magnetic element 16 detected by the sensor 19 is equal to the first predetermined value of the sensor 19, thus the display 20 remains illuminated as the processor 60 maintains supply of operating power to the display 20. Thereby the display blanking controller 70 can provide conveniences for the user to see the information on the display 20 at desired times. Additional, as the switch 10 is turned off whenever the magnetic flux of the magnetic element 16 detected by the sensor 19 is equal to the second predetermined value of the sensor 192, thus the display 20 is blanked to conserve battery power as the processor 60 cuts off supply of operating power to the display 20.

It is to be understood, however, that even though numerous characteristics and advantages of the present invention have been set forth in the foregoing description, together with details of the structure and function of the invention, the disturning on is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable electronic device, comprising:
a battery for supplying operating power;
a housing;
a display disposed within the housing;
a switch including a magnetic element and a sensor configured for detecting the magnetic flux of the magnetic element, the sensor having a first predetermined value for turning on the switch, the switch turning on in response to the magnetic flux of the magnetic element detected by the sensor being equal to the first predetermined value of the sensor; and
a processor coupled to the switch, the battery and the display, the processor responsive to turning on of the switch for controlling supply of operating power from the battery to the display, the processor maintaining supply of operating power from the battery to the display in response to turning on of the switch;
wherein the switch further includes a trigger, a slider and an elastic member, the trigger is releasable disposed on the housing, the slider is held between the elastic member and the trigger, the magnetic element is disposed in the slider, the elastic member is compressed between the slider and the housing; when the trigger is released from the housing, the elastic member drives the slider away from the sensor.

2. The portable electronic device of claim 1, wherein the sensor provides a first indication when the magnetic element is located away from the sensor, the sensor is electrically coupled to the processor for providing the first indication to the processor, the processor is responsive to the first indication of the sensor for providing a first blanking control signal, the processor maintains supply of operating power to the display in response to the first blanking control signal.

3. The portable electronic device of claim 2, wherein the sensor provides a second indication when the magnetic element is located adjacent to the sensor, the processor is responsive to the second indication of the sensor for providing a second blanking control signal, the processor interrupts supply of operating power to the display in response to the second blanking control signal.

4. The portable electronic device of claim 3, wherein the housing has a hollow retaining base, the retaining base has a blind hole defined therein, the trigger is releasably accommodated in the blind hole.

5. The portable electronic device of claim 4, wherein the trigger has a slot defined therein, the retaining base has an inner wall formed in the blind hole, the inner wall has a plurality of protrusions protruding therefrom, the protrusions releasably latched into the slot.

6. The portable electronic device of claim 5, wherein the trigger has a block protruding from a peripheral wall thereof and located adjacent to one end thereof, the slot is defined on the peripheral wall thereof and located adjacent to another end thereof.

7. The portable electronic device of claim 6, wherein the trigger is a stylus.

8. The portable electronic device of claim 4, wherein the retaining base has a trough defined through a sidewall thereof, the portion of the slider is slidably accommodated in the trough.

9. The portable electronic device of claim 8, wherein the slider includes a body section, a connecting section protruding outwardly from the body section and a securing section protruding from an distal end of the connecting section, the slider has a securing portion defined among the body section, the connecting section and the securing section, the magnet is accommodated in the securing portion.

10. The portable electronic device of claim 9, wherein a positioning pole protrudes outwardly from the bottom wall of the body section, the elastic member is a compressed spring, the elastic member is winded on the positing pole.

11. The portable electronic device of claim 9, wherein one end of the elastic member is resisted against the bottom wall of the body section, another end of the elastic member is resisted against the bottom wall of the blind hole.

12. The portable electronic device of claim 8, wherein the retaining base has two inner walls, including a first inner wall situated parallel to and adjacent to the bottom wall of the blind hole, and a second inner wall situated opposite to the first inner wall, the inner walls are configured to limit the moving distance of the slider.

13. A portable electronic device, comprising:
a housing;
a display disposed within the housing;
a switch including a magnetic element slidably disposed within the housing and a sensor, the sensor is fixed within the housing and configured for detecting the variation of magnetic flux of the magnetic element, the sensor having a first predetermined value for turning on the switch, the switch turning on in response to the magnetic flux of the magnetic element detected by the sensor being equal to the first predetermined value of the sensor; and
a processor coupled to the switch and the display, the processor responsive to turning on of the switch for controlling supply of operating power to the display, the processor maintaining supply of operating power to the display in response to turning on of the switch;
wherein the switch further includes a trigger, a slider and an elastic member, the trigger is releasable disposed on the housing, the slider is held between the elastic member and the trigger, the magnetic element is disposed in the slider, the elastic member is compressed between the slider and the housing; when the trigger is released from the housing, the elastic member drives the slider away from the sensor.

14. The portable electronic device of claim 13, wherein the sensor provides a first indication when the magnetic element is located away from the sensor, the sensor is electrically coupled to the processor for providing the first indication to the processor, the processor is responsive to the first indication of the sensor for providing a first blanking control signal, the processor maintains supply of operating power to the display in response to the first blanking control signal.

15. The portable electronic device of claim 14, wherein the sensor provides a second indication when the magnetic element is located adjacent to the sensor, the processor is responsive to the second indication of the sensor for providing a second blanking control signal, the processor interrupts supply of operating power to the display in response to the second blanking control signal.

16. A display blanking controller, comprising:
a battery for supplying operating power;
a housing;
a display disposed within the housing;
a switch including a magnetic element and a sensor configured for detecting the magnetic flux of the magnetic element, the sensor having a first predetermined value for turning on the switch, the switch turning on in response to the magnetic flux of the magnetic element detected by the sensor being equal to the first predetermined value of the sensor; and a processor coupled to the switch, the battery and the display, the processor responsive to turning on of the switch for controlling supply of operating power from the battery to the display, the processor maintaining supply of operating power from the battery to the display in response to turning on of the switch;

wherein the switch further includes a trigger, a slider and an elastic member, the trigger is releasable disposed on the housing, the slider is held between the elastic member and the trigger, the magnetic element is disposed in the slider, the elastic member is compressed between the slider and the housing; when the trigger is released from the housing, the elastic member drives the slider away from the sensor.

17. The portable electronic device of claim 16, wherein the sensor provides a first indication when the magnetic element is located away from the sensor, the sensor is electrically coupled to the processor for providing the first indication to the processor, the processor is responsive to the first indication of the sensor for providing a first blanking control signal, the processor maintains supply of operating power to the display in response to the first blanking control signal.

18. The portable electronic device of claim 17, wherein the sensor provides a second indication when the magnetic element is located adjacent to the sensor, the processor is responsive to the second indication of the sensor for providing a second blanking control signal, the processor interrupts supply of operating power to the display in response to the second blanking control signal.

* * * * *